Oct. 29, 1968   W. B. BORST, JR   3,408,284
SEPARATION OF iC4 FROM ALKYLATION EFFLUENT
Filed Sept. 15, 1966
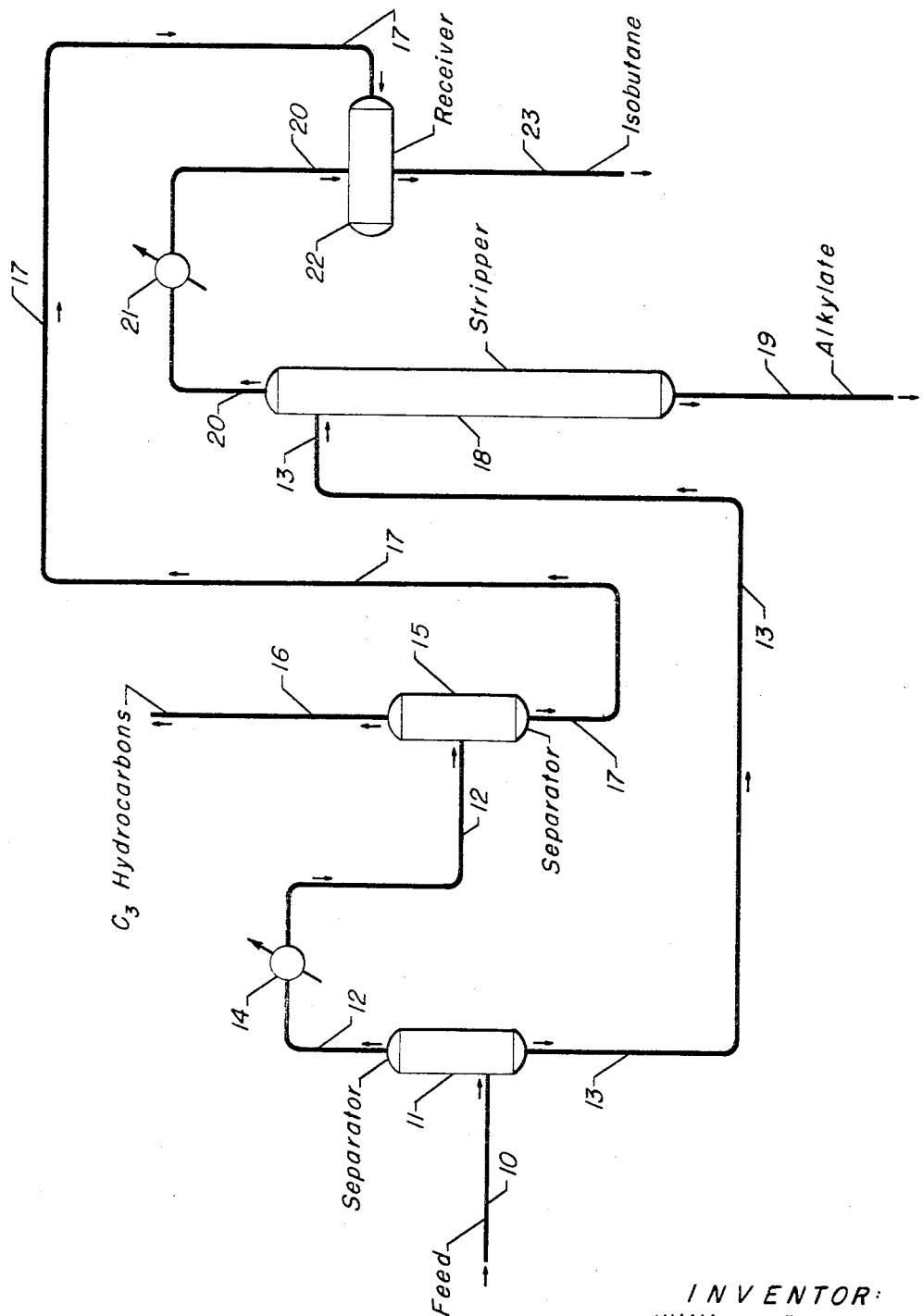
INVENTOR:
William B. Borst, Jr.
BY:
James R. Hoatson, Jr.
Joseph E. Mason, Jr.
ATTORNEYS 3,408,284
SEPARATION OF iC₄ FROM ALKYLATION EFFLUENT
William B. Borst, Jr., Mount Prospect, Ill., assignor to Universal Oil Products Company, Des Plaines, Ill., a corporation of Delaware
Filed Sept. 15, 1966, Ser. No. 579,613
5 Claims. (Cl. 208—102)

ABSTRACT OF THE DISCLOSURE

Method for separating normally gaseous paraffinic hydrocarbons from the effluent of a catalytic alkylation process. Specifically, an isobutane enriched stream is separated from the effluent of a $C_4$ alkylation reaction zone utilizing a two-stage pre-flash system prior to a conventional de-isobutanizer tower.

---

This invention relates to a fractionation scheme. It also relates to a method for separating light hydrocarbon components. It particularly relates to a method for separating normally gaseous paraffinic hydrocarbons from the effluent of a catalytic alkylation process. The invention specifically relates to the method for separating an isobutane-enriched stream from the effluent of a $C_4$ alkylation reaction zone.

It is well known in the prior art that catalytic alkylation, using a catalyst such as hydrofluoric acid, has become an important chemical tool for preparing alkylated hydrocarbons and derivatives thereof. The commercial and industrial demand of these products is exemplified by the demand for isoparaffins and alkyl-substituted benzenes of gasoline boiling range, and the demand for alkyl-substituted aromatic hydrocarbons suitable for conversion to surfactants, e.g. detergents, wetting agents, etc. The prior art processes of alkylation, generally, are effected by contacting an isoparaffin hydrocarbon feed stock with an olefin hydrocarbon in the presence of a catalyst such as hydrofluoric acid in a typical reaction vessel for conducting chemical reactions.

The catalytic alkylation process to which the present invention is applicable, consists of a process in which a mixture of hydrocarbons containing isoparaffins, such as isobutane, isopentane, and the like, and olefins, such as propylenes, butenes, isobutenes, and the like, are mixed intimately in the presence of a strong acid catalyst such as hydrofluoric acid or sulfuric acid at generally room temperatures or lower for sufficient time to complete the reaction. The effluent from the reaction zone contains saturated isoparaffins of higher molecular weight boiling point than the isoparaffin in the original mixture. Isobutane has been used almost exclusively because of its reactivity and availability to produce the high quality alkylate product. In similar manner, among the olefins butenes have been used almost exclusively.

Propylene and the pentenes and even higher boiling olefinic feed stocks can be used according to their availability; however, as is typical in most commercial chemical plants, the reaction between the isobutane and the butylene is not complete. Accordingly, there is a large excess of the isoparaffin hydrocarbon remaining in the effluent from the reaction zone. Therefore, it is desirable to recover for reuse the isoparaffin reactant in as high yield as possible and in as simple and economical manner as possible.

In practice, there have been numerous process schemes advanced by the prior art for accomplishing the alkylation reaction and the subsequent recovery of the isoparaffin hydrocarbon for reuse in the reaction. Generally, the prior art has taken the hydrocarbon portion of the reaction zone effluent into what is commonly called a de-isobutanizer tower wherein an isobutane stream is recovered as an overhead fraction and the desired alkylate product is removed from the bottom of the tower. The difficulty with this practice is that the feed streams from normal refinery operations to an alkylation plant contain not only the desired reactants, isobutane and butylene, but also contain $C_2$ to $C_5$ hydrocarbons in various amounts. Therefore, the overhead stream from the de-isobutanizer tower in a conventional alkylation plant not only contains isobutane but also contains at least the $C_3$ hydrocarbons which were present in the feed. In order to make an economical separation of the $C_3$ and $C_4$ hydrocarbons in the de-isobutanizer tower, the tower, of necessity, must be of considerable height and also must contain extensive condensing and receiving equipment for the overhead streams. Typically, the prior art de-isobutanizer tower is operated such that the desired isobutane fraction is condensed and a vapor fraction containing the $C_3$ hydrocarbons is removed from the overhead receiver for further processing in a depropanizer tower.

It is an object of the present invention to provide a fractionation scheme.

It is another object of this invention to provide an improved alkylation process wherein the recovery of the isoparaffin reactant for reuse in the system is accomplished in a more facile and economical manner.

It is specific object of the invention to provide a fractionation scheme for the separation of an isobutane-enriched stream from the effluent of a $C_4$ alkylation reaction zone in a more expeditious manner than has heretofore been possible.

As is previously noted, the feed stock to the conventional alkylation reaction preferably consists of isobutane and butylene. However, as will be more fully developed herein the present invention encompasses a feed mixture containing $C_3$ and $C_4$ olefins as well as the $C_2$ to $C_5$ paraffins but which will predominate in the $C_4$ hydrocarbons. In similar manner, the invention contemplates the use of any suitable catalyst material in addition to hydrofluoric acid, such as sulfuric acid, mixtures of sulfuric and phosphoric acid and certain complexes of aluminum chloride and sulfuric acid, etc.

According to this invention there is provided a method for separating an isobutane-enriched stream from the effluent of a $C_4$ alkylation reaction zone which comprises the steps of (a) passing the hydrocarbon effluent from said reaction zone into a first separation zone under conditions sufficient to produce a first vapor fraction comprising $C_3$ and $C_4$ hydrocarbons and a first liquid fraction containing isobutane; (b) partially condensing said vapor fraction under conditions sufficient to produce a second vapor fraction enriched in $C_3$ hydrocarbons and a second liquid fraction enriched in $C_4$ hydrocarbons; (c) introducing said first liquid fraction into a second separation zone and removing therefrom at a pressure of less than 200 p.s.i.g. a third vapor fraction comprising isobutane; (d) condensing said third vapor fraction; (e) passing the total effluent from the third vapor fraction condensing means into receiving means under conditions such that no vaporous fraction is withdrawn from said means; and (f) removing an isobutane-enriched stream from said receiving means.

Another embodiment of the present invention includes the returning of the isobutane-enriched stream to the reaction zone.

Still another embodiment of this invention includes the returning of the said isobutane-enriched stream together with at least part of said second liquid fraction from step (b).

A particularly advantageous embodiment of the present invention includes the condensing of the third vapor stream in step (d) by indirect heat exchange with air.

The objects and advantages of this invention will be more clearly understood from the description presented hereinbelow and from the appended drawing which is a diagrammatic representation of apparatus for practicing the invention.

The description of the present invention will be limited to the processing scheme for handling the effluent from a conventional $C_4$ alkylation reaction zone although the scope of the invention is not necessarily to be limited thereto. The effluent is prepared by means known to those skilled in the art, and generally comprises the steps of commingling an olefin-containing feed stock with an isoparaffin-containing feed stock and passing the mixture into a conventional alkylation reactor vessel. An isobutane-enriched paraffinic hydrocarbon stream is also added to the reaction zone in order that the isoparaffin to olefin ratio in the presence of catalyst is at the proper level. Means for removing the heat of reaction from the reactor vessel must be provided and the contact time in the reactor is maintained for a period sufficient to intimately mix and contact the feed mixture with the catalyst so that the alkylaion reaction can occur. The total effluent from the reaction zone is generally removed and passed into a separation means whereby the acid is separated from the hydrocarbon phase, generally by settling. The acid is returned to the process in admixture with fresh acid as needed and the hydrocarbon phase is further processed in accordance with this invention.

Referring now to the drawing, the effluent from the reaction zone, substantially free from a major portion of the hydrogen fluoride catalyst, is passed into separator 11 via line 10. For example purposes, the hydrocarbon effluent fraction in line 10 may be passed into separator 11 at the following rate based on mols per hour: 1,250 mols of propane, 5,131 mols of isobutane, 993 mols of butane, 107 mols of isopentane, and 1 mol of pentane. The remaining portion of the feed stream in line 10 comprises approximately 765 mols per hour of the desired alkylate. This will be recovered as hereinafter explained.

Typically the conditions maintained in separator 11 are sufficient to produce a first vapor fraction in line 12 comprising $C_3$ and $C_4$ hydrocarbons and a first liquid fraction in line 13 containing isobutane together with the desired alkylate stream. The operating conditions in separator 11 include, typically, a temperature of approximately 190° and a pressure of approximately 185 p.s.i.g. Under these typical conditions, approximately 37% by volume of the feed mixture is vaporized and removed via line 12. However, separator 11 may also be operated under a range of temperatures from 150° to 225° F. and pressures from 150 p.s.i.g. to 250 p.s.i.g. In the practice of this invention, the amount vaporized in line 12 should be from 25% to 50% by volume of the feed from separator 11.

The first vapor fraction having the following illustrative composition: 650 mols per hour of propane, 2,016 mols per hour of isobutane, 347 mols per hour of butane, 24 mols per hour of isopentane, and 33 mols per hour of the alkylate is passed into condenser 14 under conditions whereby this first vapor fraction is only partially condensed. The total effluent from condenser 14 is passed into separator 15 wherein a second vapor fraction is removed via line 16 containing the major proportion of $C_3$ hydrocarbons for further processing for example in a depropanizer tower not shown. A second liquid fraction is removed from separator 15 via line 17 and processed as hereinafter referred to.

The conditions in separator 15 in conjunction with condenser 14 include a typical temperature of 130° F., a typical pressure of 180 p.s.i.g. wherein approximately 29% by volume of the feed in line 12 is vaporized and removed via line 16 as hereinabove specified. The broad range of operating conditions for separator 15 applicable to the present invention include a temperature from 100° to 200° F. and pressures from 150 to 200 p.s.i.g. whereby from 10% to 50% by volume of the material in line 12 remains in the vapor phase and is removed through line 16.

The composition of the $C_3$ hydrocarbons in line 16 for this example include 282 mols per hour of propane, 496 mols per hour of isobutane, 28 mols per hour of butane. In similar manner, the composition of the liquid for example purposes in line 17 includes 368 mols per hour of propane, 1520 mols per hour of isobutane, 319 mols per hour of butane, 24 mols per hour of isopentane, and 33 mols per hour of the alkylate product.

Referring again to separator 11, the first liquid fraction removed from separtor 11 in line 13 has the following exemplary composition: 600 mols per hour of propane, 3,115 mols per hour of isobutane, 646 mols per hour of butane, 83 mols per hour of isopentane, 1 mol per hour of pentane, and 732 mols per hour of the desired alkylate product. This first liquid fraction is passed via line 13 into the isobutanizer stripper tower 18 at the upper portion thereof. Stripper tower 18 is a conventional fractionating column with feed line 13 being located above the top tray of the tower as a preferred arrangement of the apparatus. The stripper column accomplishes its fractionation preferably without external reflux and using a bottoms reboiler system for the introduction for sufficient heat for fractionation. In order to balance the system with the proper amount of normal paraffin and isoparaffin hydrocarbons, a saturate butane stream is generally passed into the upper middle portion of the stripper column by means not shown. The exact point where the saturate butane stream should enter is dependent upon the desired ratio of isoparaffin to normal paraffin hydrocarbons. This saturate butane stream also supplies isobutane to supplement that contained in the olefin-containing feed. Normal butane as a product of fractionation is withdrawn further down the column and removed by means not shown.

Stripper column 18 operates as a fractionation column and accomplishes a substantial separation between the lower boiling isobutane, the higher boiling normal butane, and the reactor effluent alkylate product. A combination of isobutane flash and alkylated hydrocarbon stripping is accomplished therein. The properly stripped alkylate product is removed from the system via line 19 for gasoline blending or for further processing as desired by those skilled in the art. Stripper 18 overhead hydrocarbons are withdrawn from the column via line 20 and passed to condenser 21 wherein the entire overhead stream is condensed to the liquid phase preferably by air cooling in condenser 21. The effluent from condenser 21 passes into receiving vessel 22 under conditions such that no vaporous stream is withdrawn therefrom.

At this point is should be noted that in the practice of this invention the removal of the $C_3$ hydrocarbons and a portion of the $C_4$ hydrocarbons by the unique two-stage pre-flash system previously described allows the equipment for the overhead of the stripper column 18 to be reduced in size and expense. Since there is no $C_3$ hydrocarbon to any significant extent present in line 20, the total condensing of the overhead vessels may now be easily accomplished by air cooling in exchanger 21. This, of course, is advantageous in those areas where cooling water is in scarce supply. In the practice of this invention, it is preferred that the stripper column overhead pressure not exceed 200 p.s.i.g. Otherwise, it would not be practical to use air cooling condensers on the system. It follows, therefore, that the unique system described by this invention allows the stripper column 18 to run at a sufficiently low pressure to enable the use of exhaust steam to supply the bulk of the column heat via the reboiler system not shown.

It should also be noted that in the prior art scheme, the condensing system such as that shown by condenser 21, must not only control pressure and condense the entire overhead, but it must also produce a propane enriched vapor. To be able to perform all of these functions, is an extremely difficult operation which lends itself to instability when attempted to be performed by air cooling. However, in the practice of this invention, there is no need for a vapor stream off of this overhead convention condenser. Therefore, it can be run flooded and may cool as low as possible with air. This of course, effects considerable economies into the operation of the fractionation scheme.

An isobutane-enriched stream is removed from receiver 22 via line 23, and preferably in the practice of one embodiment of this invention, is returned to the reactor zone. As previously noted, the second liquid fraction in line 17 is now passed in one embodiment of this invention also into receiver 22 in admixture with the condensed liquid from condenser 21. Alternatively, the material in line 17 may be passed, by means not shown, in admixture with the isobutane-enriched stream in line 23 for reuse of the reaction zone. Still further, it is within the practice of this invention for the material in line 17 to be returned separately to the reaction zone.

For illustrative purposes the amount of material passing into receiver 22 from condenser 21 typically will be as follows: 599 mols per hour of propane, 2,960 mols per hour of isobutane, 482 mols per hour of butane, 17 mols per hour of isopentane, and 36.9 mols per hour of the alkylate product. In similar manner the material passing into receiver 22 from line 17 typically is as follows: 368 mols per hour of propane, 1520 mols per hour of isobutane, 319 mols per hour of butane, 24 mols per hour of isopentane, and 32.9 mols per hour of the alkylate product. The composition of the alkylate product in line 19 for this example includes 156 mols per hour of isobutane, 164 mols per hour of butane, 65 mols per hour of isopentane, 1 mol per hour of pentane, and 696 mols per hour of the desired alkylate product.

Conventional conversion conditions of temperature, pressure, isoparaffin-olefin ratio, and hydrogen fluoride-hydrocarbon ratio can be employed advantageously in the reaction zone contemplated herein. For example, the alkylation of isobutane with butylenes can be carried out at temperatures between 0° F. and 150° F., preferably between 80° F. and 110° F., at pressures sufficiently high to keep the hydrocarbon and catalyst in liquid phase and at isobutane-butylene ratios between 2:1 and 20:1, preferably between 10:1 and 15:1. Ratios of isobutane to butylene of at least 2:1 are essential since lower ratios tend to cause polymerization of the butylenes with a resulting decrease in yield of alkylate product. The ratio of catalyst to hydrocarbon charge can be varied considerably. For example, a ratio of 1:1 to 10:1 can be used, preferably at least 2:1 is used. The acid catalyst charged to the reactors can be substantially anhydrous and can have a titratable acidity as low as 65% by weight, but preferably is maintained between 85% and 95% acidity.

When operating a hydrogen fluoride alkylation unit in the manner hereinabove described utilizing the process of the present invention, an alkylate product having an endpoint below 400° F. and a leaded octane (at 3 cc. of TEL per gallon of alkylate) of at least 105 is obtained with a hydrogen fluoride catalyst consumption of less than 0.2 pound of catalysts per barrel of alkylate produced. Additionally, significant economy of operation is achieved over the process schemes taught by the prior art.

The invention claimed:

1. Method for separating an isobutane-enriched stream from the effluent of a $C_4$ alkylation reaction zone which comprises the steps of:
    (a) passing the hydrocarbon effluent from said reaction zone into a first flash separation zone under conditions sufficient to produce a first vapor fraction comprising $C_3$ and $C_4$ hydrocarbons in an amount from 25% to 50% by volume of said hydrocarbon effluent and a first liquid alkylate fraction containing isobutane;
    (b) partially condensing said vapor fraction and passing the total effluent from the partial condensing means into a second flash separation zone under conditions sufficient to produce a second vapor fraction enriched in $C_3$ hydrocarbons in an amount from 10% to 50% by volume of said vapor fraction and a second liquid fraction enriched in $C_4$ hydrocarbons;
    (c) introducing said first liquid fraction into a distillation zone and removing therefrom at a pressure of less than 200 p.s.i.g. a third normally gaseous vapor fraction comprising isobutane;
    (d) condensing said third vapor fraction;
    (e) passing the total effluent from the third vapor fraction condensing means into receiving means under conditions such that no vaporous fraction is withdrawn from said means; and,
    (f) removing an isobutane-enriched stream from said receiving means.

2. Method according to claim 1 wherein said isobutane-enriched stream is returned to the reaction zone.

3. Method according to claim 2 wherein said isobutane-enriched stream so returned contains at least part of said second liquid fraction from step (b).

4. Method according to claim 1 wherein said isobutane-enriched stream and said second liquid fraction from step (b) are returned to the reaction zone.

5. Method according to claim 4 wherein said third vapor stream is condensed in step (d) by indirect heat exchange with air.

References Cited

UNITED STATES PATENTS

| | | | |
|---|---|---|---|
| 2,320,616 | 6/1943 | Kniel et al. | 208—105 |
| 2,382,067 | 8/1945 | Kniel | 208—102 |
| 3,162,694 | 9/1966 | Beavon | 260—683.62 |

DELBERT E. GANTZ, *Primary Examiner.*

H. LEVINE, *Assistant Examiner.*